(12) United States Patent  
Fujii

(10) Patent No.: US 7,634,107 B2
(45) Date of Patent: Dec. 15, 2009

(54) ROADWAY TYPE JUDGMENT METHOD AND APPARATUS

(75) Inventor: Asako Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 579 days.

(21) Appl. No.: 11/295,643

(22) Filed: Dec. 7, 2005

(65) Prior Publication Data

US 2007/0024467 A1 Feb. 1, 2007

(30) Foreign Application Priority Data

Jul. 28, 2005 (JP) ............................. 2005-218501

(51) Int. Cl.
*G06K 9/00* (2006.01)
(52) U.S. Cl. ..................... 382/103; 701/200
(58) Field of Classification Search ................ 382/100, 382/103, 104, 164, 165, 169, 170, 181, 190, 382/195, 199; 701/1, 10, 65, 200
See application file for complete search history.

(56) References Cited

U.S. PATENT DOCUMENTS

| 4,991,223 | A | * | 2/1991 | Bradley | ....................... | 382/165 |
| 6,246,174 | B1 | * | 6/2001 | Hurtgen et al. | ............... | 315/77 |
| 6,343,869 | B1 | * | 2/2002 | Kobayashi | ................... | 362/37 |
| 6,587,573 | B1 | * | 7/2003 | Stam et al. | .................. | 382/104 |
| 6,677,986 | B1 | * | 1/2004 | Pochmuller | ................. | 348/149 |
| 7,239,231 | B2 | * | 7/2007 | Tsukamoto | .................. | 340/438 |
| 2003/0123705 | A1 | * | 7/2003 | Stam et al. | ................... | 382/104 |
| 2006/0159309 | A1 | | 7/2006 | Tsukamoto | | |

FOREIGN PATENT DOCUMENTS

| DE | 19704818 | 8/1997 |
| JP | 60-240545 | 11/1985 |
| JP | 09-205645 | 8/1997 |
| JP | 11-139225 | 5/1999 |
| JP | 2001-039210 | 2/2001 |
| JP | 2004-230963 | 8/2004 |

OTHER PUBLICATIONS

Office Action issued Jan. 10, 2008 for corresponding German Patent Application No. DE102006005443.

* cited by examiner

*Primary Examiner*—Anand Bhatnagar
(74) *Attorney, Agent, or Firm*—Fujitsu Patent Center

(57) ABSTRACT

This invention is to provide a tunnel detection technique, which is hardly affected by external circumstance at each time. A roadway type judgment method according to the invention includes: calculating, with respect to image data from a camera mounted in or on a vehicle or image data obtained by carrying out a specified conversion on the image data from the camera, a feature amount of at least one component among plural components in a specified color space of the image and storing the calculated feature amount into a feature amount data storage; determining whether or not the feature amount stored in the feature amount data storage satisfies a predetermined condition; based on a determination result at the determining, judging whether or not the vehicle travels inside a tunnel.

15 Claims, 15 Drawing Sheets

| $\sigma_1^2$ | $v_2$ | $S_i$ |
|---|---|---|
| 51 | 176 | 0 |
| 63 | 163 | 0 |
| 15 | 86 | 1 |
| 18 | 79 | 1 |
| ⋮ | ⋮ | ⋮ |

| $\sigma_1^2$ | $v_2$ | $v_3$ | $S_i$ | $S_o$ |
|---|---|---|---|---|
| 13 | 67 | 115 | 1 | 0 |
| 25 | 87 | 174 | 1 | 1 |
| 55 | 135 | 198 | 0 | 1 |
| 62 | 125 | 103 | 0 | 0 |
| ⋮ | ⋮ | ⋮ | ⋮ | ⋮ |

| $\sigma_1^2$ | $v_2$ | $v_3$ | VARIATION x | $S_i$ | $S_o$ | $S_t$ |
|---|---|---|---|---|---|---|
| 13 | 67 | 115 | 3 | 1 | 0 | 1 |
| 25 | 87 | 174 | 20 | 1 | 1 | 0 |
| 55 | 135 | 198 | 48 | 0 | 1 | 0 |
| 62 | 125 | 103 | -10 | 0 | 0 | 0 |
| ⋮ | ⋮ | ⋮ | ⋮ | ⋮ | ⋮ | ⋮ |

| s | $\sigma_1^2$ | $v_2$ | $S_i$ |
|---|---|---|---|
| 1/500 | 51 | 176 | 0 |
| 1/1000 | 63 | 163 | 0 |
| 1/1000 | 15 | 86 | 0 |
| 1/5000 | 18 | 79 | 1 |
| ⋮ | ⋮ | ⋮ | ⋮ |

ROADWAY TYPE JUDGMENT METHOD AND APPARATUS

TECHNICAL FIELD OF THE INVENTION

The present invention relates to a roadway type judgment technique, and more particularly to a detection technique of a tunnel.

BACKGROUND OF THE INVENTION

For example, JP-A-11-139225 discloses a tunnel detection apparatus provided in a vehicle, for detecting a tunnel according to the traveling of the vehicle. Specifically, a setting density region detection unit detects a region of specified density from a forward road image photographed by a photographing unit. Because a tunnel is photographed under an illumination condition different from a surrounding environment, the inlet of the tunnel or the outlet thereof appears as a different density region on the image. Accordingly, when those are detected as specified density regions, the inlet or the outlet region indicating the existence of the tunnel is detected.

In addition, JP-A-2001-39210 discloses a technique in which before a vehicle enters a dark place such as a tunnel, the light of the vehicle is suitably automatically switched on to improve the sense of use, convenience and safety. Specifically, a lighting control apparatus automatically switches on or off the light of the vehicle according to an illumination measured value by an illuminometer, and includes a video camera for taking a photograph in a traveling direction, a dark part detection unit, which calculates the occupying ratio of a dark portion in the image data of a forward view image obtained by the video camera and outputs a dark portion detection notice in the case where the occupying ratio exceeds a predetermined first dark portion threshold, and a light control unit to automatically switch on the light in preference to the lighting control based on the illumination measured value of the illuminometer when the dark portion detection notice is received from the dark portion detection unit. Accordingly, even when the vehicle travels in the daytime and in bright environment, in the case where a dark place such as a tunnel exists in the traveling direction, sufficiently before the vehicle enters the dark place, the light is automatically switched on.

Furthermore, JP-A-9-205645 discloses a forward environment recognition apparatus in which it is possible to prevent an image signal value from becoming excessively small or excessively large in total when a vehicle enters or comes out of a tunnel, and an image processing can be always certainly carried out based on the suitable image signal. Specifically, in a case where an image pattern of an inlet of a tunnel is previously stored in a memory of an image processing unit, based on the pattern matching between the image pattern and an image object over a road white line, it is confirmed that this is the inlet of the tunnel. Then, based on the number of pixels occupying under the inlet of the tunnel, a distance between the traveling vehicle and the inlet of the tunnel is calculated. Besides, in a case where iris value data (inlet iris map) set for each distance to the inlet of the tunnel is previously stored in the memory, when the vehicle approaches a place distant from the inlet of the tunnel by a predetermined distance, normal iris value control (auto iris control) is gradually changed to iris value control in the tunnel by a control unit, and the iris opening of a CCD camera is controlled based on the iris value data corresponding to each distance to the inlet of the tunnel. As a result, it is possible to prevent the image signal value from becoming excessively small in total when the vehicle enters the tunnel, and the image processing can be certainly carried out based on the suitable image signal.

Moreover, JP-A-2004-230963 discloses a vehicular tunnel detection method in which even in the case where a preceding vehicle exists, the inlet of a tunnel can be certainly detected, and the cost can be reduced. Specifically, in an image processing unit (tunnel detection unit), in the case where a tunnel recognition unit using a distance judges that the center portion (in the tunnel) is farther than both right and left side portions (right and left wall surfaces of the inlet of the tunnel) of an image A, and a tunnel recognition unit using luminance judges that the luminance of the center portion (in the tunnel) is darker than those of both the right and left side portions (right and left wall surfaces of the tunnel inlet), the inlet of the tunnel is detected.

In the conventional techniques described above, the tunnel is detected by using the difference in the lightness between the inlet and the outlet of the tunnel, the tunnel is detected by previously preparing the image pattern of the inlet of the tunnel and by carrying out the matching, or the tunnel is detected by using the stereo camera to obtain the distance information and by utilizing a fact that only the tunnel inlet portion has a large distant. In the tunnel detection methods of the conventional techniques as stated above, there is a problem that because the detection of the tunnel is carried out by using the feature of the inlet or the outlet of the tunnel, the inlet or the outlet of the tunnel cannot be detected due to the existence of a preceding vehicle or in the night, and it is impossible to discriminate whether the vehicle travels inside the tunnel or outside the tunnel.

SUMMARY OF THE INVENTION

An object of the invention is therefore to provide a tunnel detection technique, which is hardly affected by external circumstance at each time.

A roadway type judgment method according to the invention includes: calculating, with respect to image data from a camera mounted in or on a vehicle or image data obtained by carrying out a specified conversion on the image data from the camera, a feature amount of at least one component among plural components in a specified color space of the image and storing the calculated feature amount into a feature amount data storage; determining whether or not the feature amount stored in the feature amount data storage satisfies a predetermined condition; and based on a determination result in the determining, judging whether or not the vehicle travels inside a tunnel.

Thus, because the aforementioned feature amount is different between the inside of the tunnel and the outside of the tunnel, when a suitable condition is set for the feature amount, the tunnel can be detected without being affected by the external circumstances such as the existence of a preceding vehicle or the night. Therefore, the lighting control of a light, the operation control of a wiper and the like can be suitably carried out. Incidentally, the feature amount is the feature amount concerning, for example, the whole image data or most of it.

The feature amount may include a feature amount of the intensity and a feature amount of the hue. In addition, the predetermined condition may include a condition relating to the intensity and a condition relating to the hue. Incidentally, the feature amount of the intensity is, for example, an average value of the intensity values, and the feature amount of the hue is, for example, a variance value of the hue values. Moreover, the condition relating to the intensity is, for example, a condition relating to the average value of the intensity values, and the condition relating to the hue is, for example, a condition relating to the variance value of the hue values.

Further, the feature amount may include a feature amount with respect to the whole image data and a feature amount with respect to a specified portion of the image data. In addition, the specified condition may include a condition with respect to the whole image data and a condition with respect to the specified portion of the image data. The specified portion of the image data is, for example, a region (for example, a forward upper portion) in which the feature amount is significantly different between the inside of the tunnel and the outside of the tunnel. Thus, when traveling in the tunnel and traveling outside the tunnel are discriminated by using the feature amount with respect to the region in addition to the feature amount with respect to the whole image data, the judgment can be made with high accuracy.

Further, the roadway type judgment method according to the invention may be further include: calculating a feature amount concerning change between first image data and second image data photographed before the first image data, and storing the calculated feature amount into the feature amount data storage; and determining whether the feature amount concerning the change satisfies a condition representing entrance into the tunnel or a condition representing exit from the tunnel. Then, the judging may be carried out based further on a result of determining using the feature amount concerning the change. Thus, by specifying the entering the tunnel or the exiting the tunnel also from the temporal change of the image, the accuracy of the judgment can be improved. Incidentally, the feature amount concerning the change is, for example, a variation of the average value of the intensity values, a change rate thereof, or the like.

It is possible to create a program for causing a computer to execute the aforementioned method according to this invention, and this program is stored in a storage medium or a storage device such as a flexible disk, a CD-ROM, an optical magnetic disk, a semiconductor memory, and a hard disk. Further, the program may be distributed as a digital signal through a network. Incidentally, intermediate processing results are temporarily stored in a storage device such as a main memory.

DETAILED DESCRIPTION OF THE PREFERRED EMBODIMENTS

Embodiment 1

Figure 1:
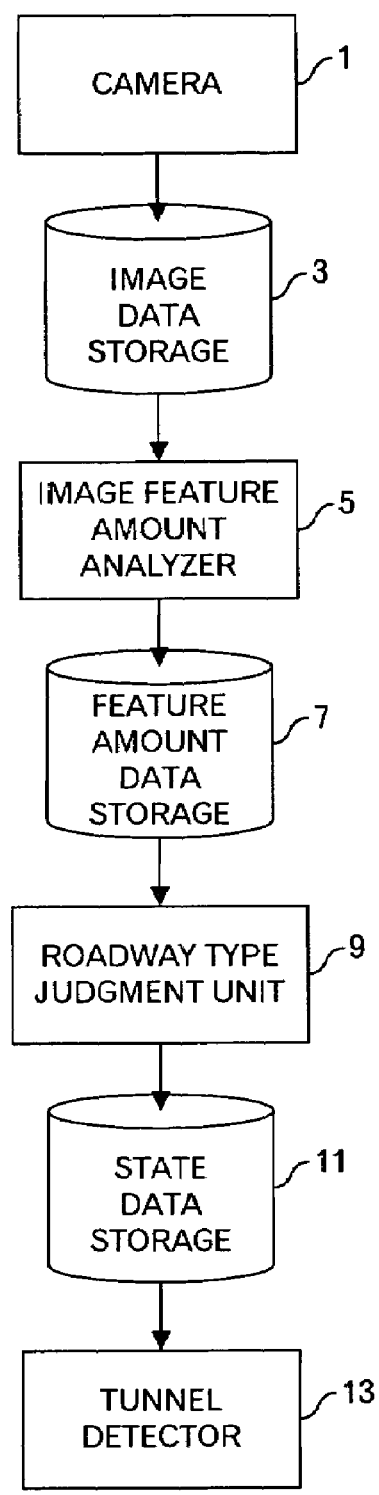
FIG. 1 is a functional block diagram of a first embodiment of the invention.

FIG. 1 is a functional block diagram of a roadway type judgment apparatus in a first embodiment of the present invention. The roadway type judgment apparatus of this embodiment includes a camera 1 such as a CCD camera or a CMOS camera, an image data storage 3 to store image data photographed by the camera 1, an image feature amount analyzer 5 to carry out a processing described below on the image data stored in the image data storage 3, a feature amount data storage 7 to store a processing result of the image feature amount analyzer 5, a roadway type judgment unit 9 to carry out a processing described below on the data stored in the feature amount data storage 7, a state data storage 11 to store a processing result of the roadway type judgment unit 9, and a tunnel detector 13 to carry out a processing described below based on the data stored in the state data storage 11.

The camera 1 is mounted in a vehicle or the like, and is placed to be directed in a direction toward the front, rear, side or the like of the vehicle. However, a description will be given to a case where the camera is placed to be directed toward the front of the vehicle. The camera 1 has an AGC (Auto Gain Control) function and a control function of white balance. Besides, an image is photographed at, for example, 30 fps (frame per second) and data of the photographed image is stored in the image data storage 3 every frame.

Figure 2:
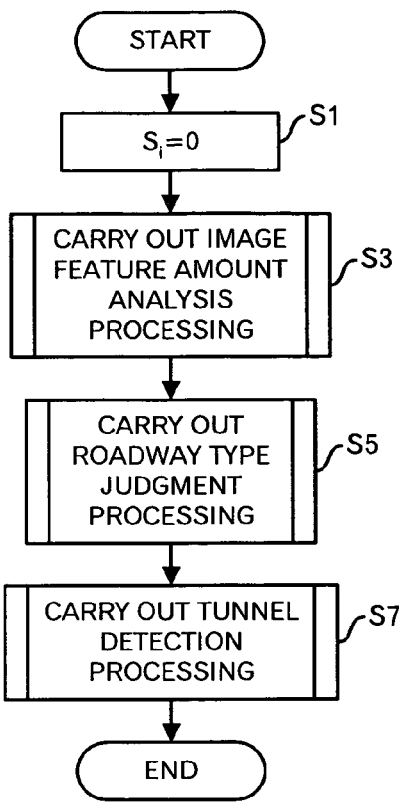
FIG. 2 is a diagram showing a main processing flow in the first embodiment of the invention.

Hereinafter, the processing contents of the roadway type judgment apparatus shown in FIG. 1 will be described with reference to FIGS. 2 to 7. First, for example, the image feature amount analyzer 5 initializes a variable $S_i$ indicating a detection state concerning traveling in a tunnel to 0 (FIG. 2: step S1). The image feature amount analyzer 5 carries out an image feature amount analysis processing (step S3). The image feature amount analysis processing will be described with reference to FIG. 3. Here, a description will be given to an example in which a variance value $\sigma_1^2$ of hue values h(x,y) and an average value $v_2$ of intensity values v(x,y) with respect to the whole image data are used as feature amounts f(x,y).

The image feature amount analyzer 5 calculates the variance value $\sigma_1^2$ of the hue values h(x,y) on the whole image data stored in the image data storage 3, and stores the calculated variance value $\sigma_1^2$ into the feature amount data storage 7 (step S11). Incidentally, x denotes a position of a pixel in the horizontal direction, and x=0 means the left end. Besides, y denotes a position of a pixel in the vertical direction, and y=0 means the upper end. In this embodiment, because the hue and the intensity are treated, in the case where the image data stored in the image data storage 3 is in RGB or YCC format, a color conversion is first carried out to carry out the step S11.

Further, the image feature amount analyzer 5 calculates the average value $v_2$ of the intensity values (lightness) v(x,y) on the whole image data stored in the image data storage 3, and stores the calculated average value $v_2$ into the feature amount data storage 7 (step S13).

The average value $v_2$ of the intensity value v(x,y) in a specified range S of the image data, and the variance value $\sigma_1^2$ of the hue values h(x,y) in the specified range S are calculated by following expressions.

$$v_2 = \frac{\sum_S v(x, y)}{S}$$

$$\sigma_1^2 = \frac{\sum_S (h(x, y) - h)^2}{S}$$

Incidentally, h denotes an average value of h(x,y). Besides, S in $\Sigma$ denotes that addition is made with respect to all pixels in S, and S of the denominator denotes a region (the number of pixels) of the image S.

Returning to the description of FIG. 2, next the roadway type judgment unit 9 carries out a roadway type judgment processing (step S5). The traveling path judgment processing will be described with reference to FIG. 4 and FIG. 5.

Figure 4:
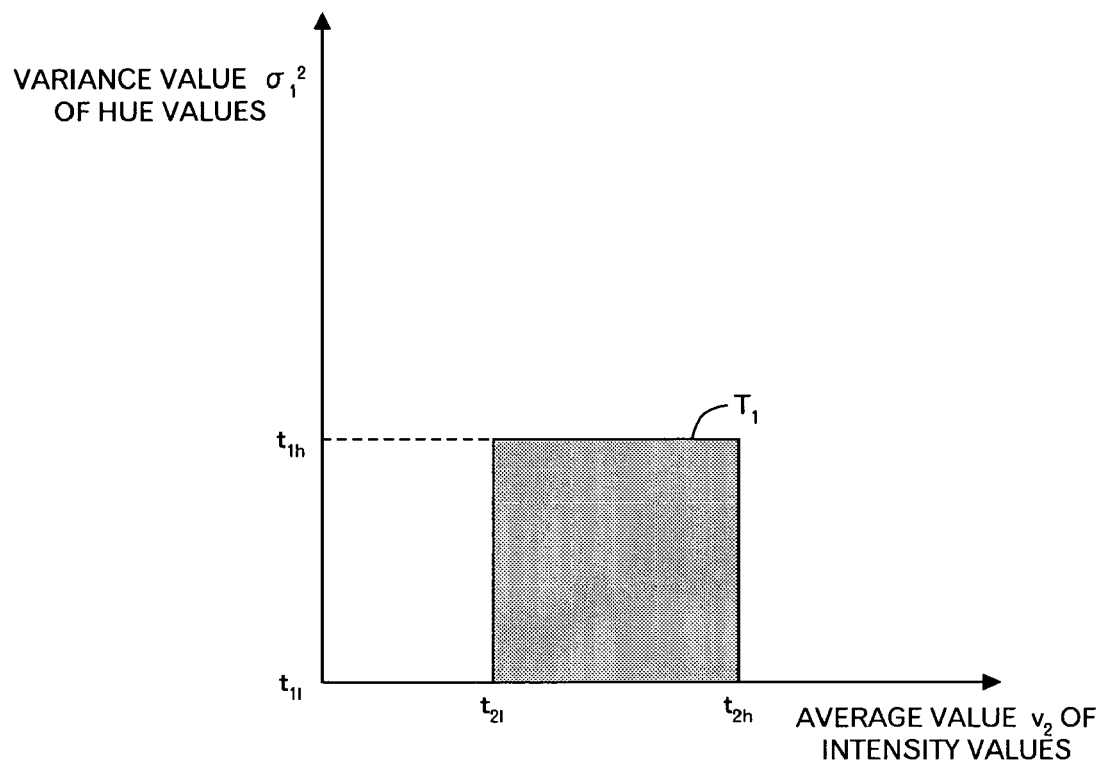
FIG. 4 is a diagram to explain a range of an average value of intensities and a range of a variance value of hues in the first embodiment of the invention.

The roadway type judgment unit 9 in this embodiment judges whether the vehicle in which the camera 1 is mounted travels in a tunnel or not. The illumination in the inside of a tunnel is often the same in color and lightness in the inside of one tunnel. Besides, the illumination having color such as of red, yellow, or white often has the constant color tone. The roadway type judgment unit 9 of this embodiment uses this feature, and detects a state in which the vehicle travels in the tunnel. Specifically, in the tunnel where the illumination is installed, as compared with the daytime in which there is sunlight or the nighttime in which there are influences of various illuminations, because the illumination is constant, the intensity (lightness) falls within a certain range, and the variance of the hue values becomes small because a specific color is dominant. Thus, the average value $v_2$ of the intensity values ought to fall between its lower limit $t_{2l}$ and upper limit $t_{2h}$, and the variance value $\sigma_1^2$ of the hue values ought to fall between its lower limit $t_{1l}$ and upper limit $t_{1h}$. These relations are expressed in a graph as shown in FIG. 4. In the graph of FIG. 4, the horizontal axis indicates the average value $V_2$ of the intensity values, and the vertical axis indicates the variance value $\sigma_1^2$ of the hue values. A region $T_1$ is a region in which it is judged that traveling is carried out in a tunnel. However, the range $T_1$ is not limited to the rectangular range as stated above, and it may be regulated in accordance with its substance.

Figure 5:
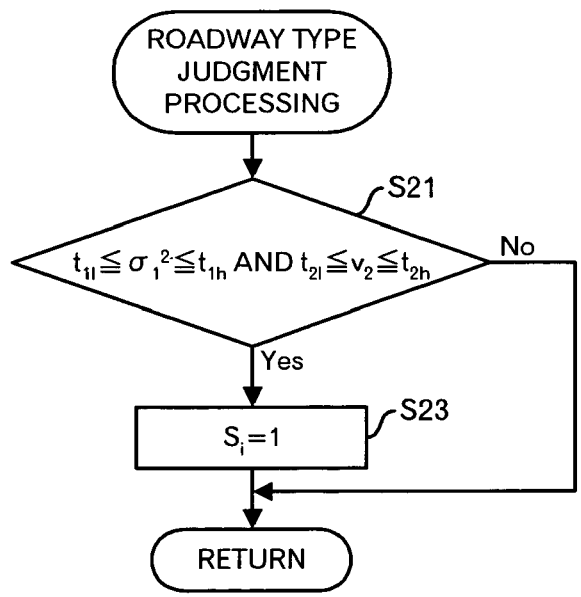
FIG. 5 is a diagram showing a processing flow of a roadway type judgment processing in the first embodiment of the invention.

Accordingly, as shown in FIG. 5, the roadway type judgment unit 9 judges whether the average value $v_2$ of the intensity values and the variance value $\sigma_1^2$ of the hue values stored in the feature amount data storage 7 satisfy the condition of $t_{1l} \leq \sigma_1^2 \leq t_{1h}$ and $t_{2l} \leq v_2 \leq t_{2h}$ (step S21). In the case where it is judged that the condition is not satisfied, the processing returns to the original processing. That is, the variable $S_i$ remains $S_i=0$. On the other hand, in the case where it is judged that the condition is satisfied, the roadway type judgment unit 9 sets $S_i=1$ (step S23). The variable $S_i$ is stored as state data into the state data storage 11. Then, the processing returns to the original processing.

Figures 6, 7:
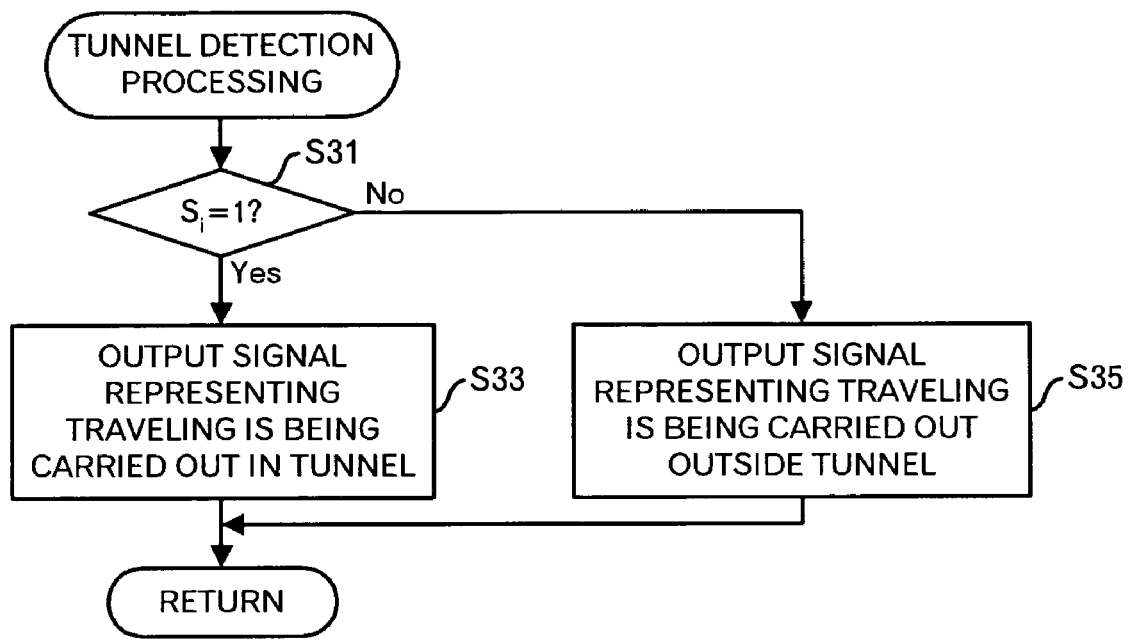
FIG. 6 is a diagram showing a processing flow of a tunnel detection processing in the first embodiment of the invention.
FIG. 7 is a diagram showing a specific example in the first embodiment of the invention.

Returning to the description of FIG. 2, the tunnel detector 13 next carries out the tunnel detection processing (step S7) This processing will be described with reference to FIG. 6. The tunnel detector 13 judges whether or not the value of $S_i$ stored in the state data storage 11 is 1 (step S31). In the case of $S_i=1$, the tunnel detector 13 outputs a signal indicating that traveling is being carried out in a tunnel (step S33). A light controller having received this signal switches on the light. Besides, a wiper controller having received this signal stops the operation of a wiper. In addition, with respect to a device, which becomes necessary in the tunnel, its operation is started, and with respect to a device, which becomes unnecessary, its operation is stopped. On the other hand, in the case of $S_i=0$, the tunnel detector 13 outputs a signal indicating that traveling is being carried out outside a tunnel (step S35). The light controller having received this signal switches off the light. Besides, for example, when detecting that it rains, the wiper controller having received this signal automatically starts the operation of the wiper. In addition, with respect to a device, which becomes necessary outside the tunnel, its operation is started, and with respect to a device, which becomes unnecessary, its operation is stopped. After step S33 or S35, the processing returns to the original processing.

Incidentally, in the case where the variable $S_i$ is not $S_i=1$, it is also possible to judge that the state is unclear.

By doing so, a judgment can be made with high accuracy as to whether traveling is being carried out in the tunnel or outside the tunnel, while the influence of external circumstances such as a preceding vehicle or a time zone can be suppressed.

Incidentally, the processing shown in FIG. 2 is carried out at every predetermined interval such as every frame.

For example, it is assumed that the respective limit values are $t_{1l}=0$, $t_{1h}=48$, $t_{2l}=0$ and $t_{2h}=98$. When $\sigma_1^2$ and $v_2$ as shown in FIG. 7 are calculated, it is judged that the condition as the premise is satisfied at the third frame from the top and the fourth frame, and $S_i=1$ is set. That is, at the third frame and the fourth frame, it is judged that traveling is being carried out in a tunnel.

Figure 3:
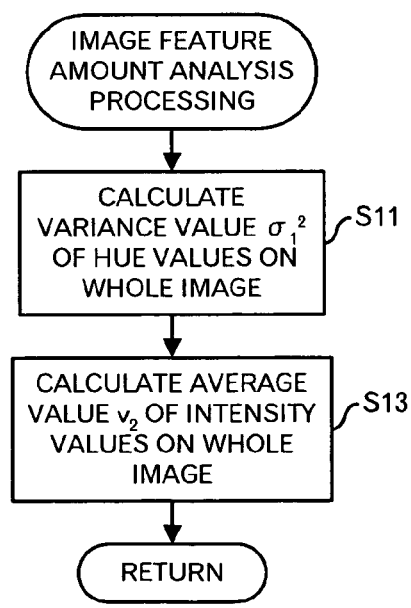
FIG. 3 is a diagram showing a processing flow of an image feature amount analysis processing in the first embodiment of the invention.

Incidentally, in the image feature amount analysis processing of FIG. 3, although the description has been given to the example in which the variance value $\sigma_1^2$ of the hue values h(x,y) with respect to the whole image data and the average value $v_2$ of the intensity values v(x,y) are used as the feature amount, the variance value, the average value or both may be calculated with respect to a predetermined arbitrary area S in the image. With respect to the feature amount f(x,y), not only at least one of the intensity (V), hue (H) and chroma (S) expressed in HSV format, but also at least one component in spaces expressed in various formats such as RGB format, YCbCr format, L*a*b* format, and L*u*v* format may be used. Besides, a result obtained by applying a spatial filter typified by a Laplacian filter or a Sobel filter to the image data expressed in one of those formats may be used as the feature amount f(x,y). In that case, a processing using the spatial filter is carried out before the step S11 of FIG. 3.

Besides, in the roadway type judgment processing of FIG. 5, although the range in which it is judged that traveling is being carried out in a tunnel is regulated by the upper limit and the lower limit of the average value of the intensity values and the upper limit and the lower limit of the variance value of the hue values as shown in the graph of FIG. 4, also in the case where the feature amount f(x,y) is other than the intensity and the hue, with respect to a component adopted as the feature amount f(x,y), a range in which it is judged that traveling is being carried out in a tunnel may be statistically specified.

Embodiment 2

Figure 8:
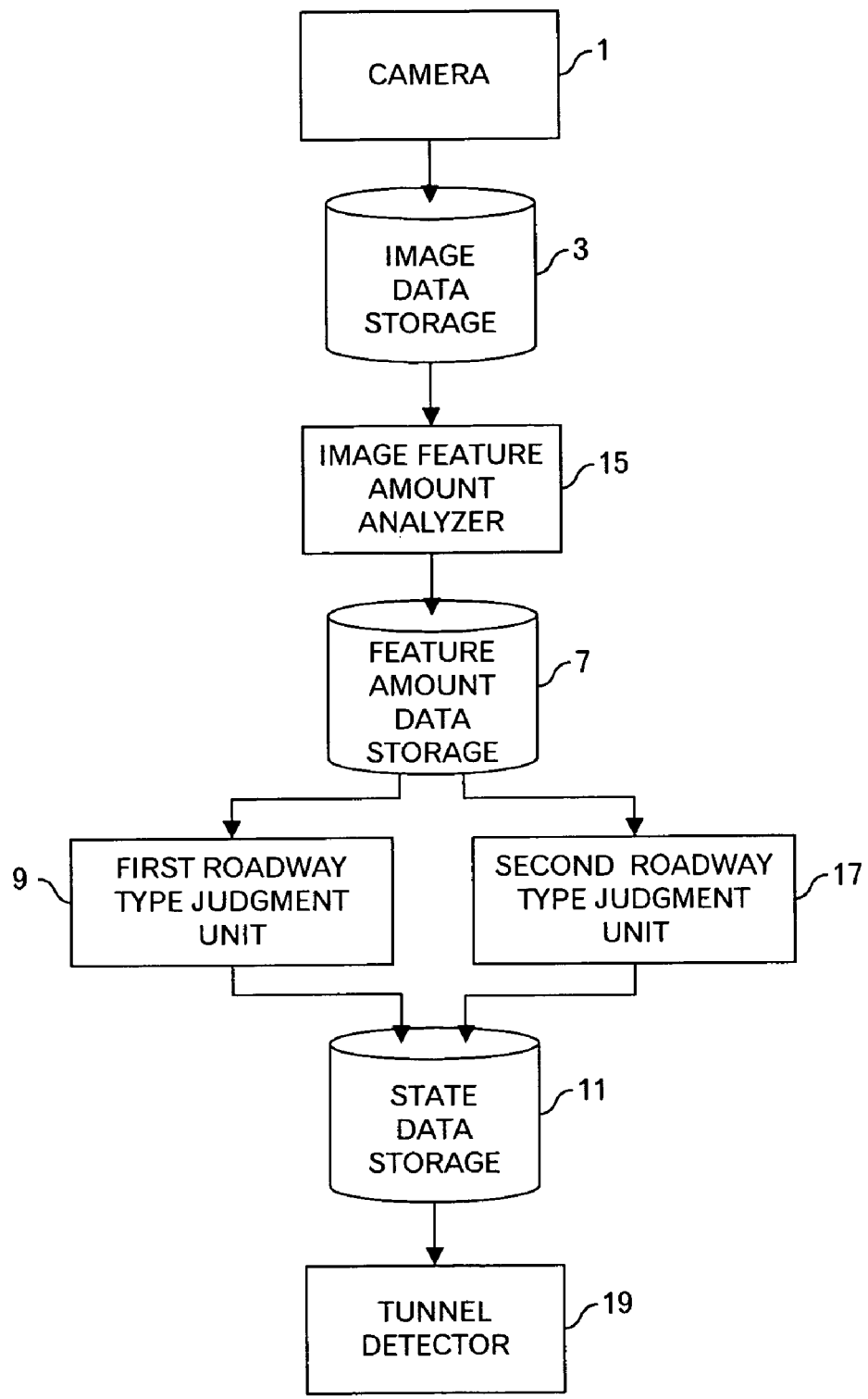
FIG. 8 is a functional block diagram of a second embodiment of the invention.

FIG. 8 is a functional block diagram of a roadway type judgment apparatus according to a second embodiment of the present invention. The roadway type judgment apparatus of this embodiment includes a camera 1, an image data storage 3 to store image data photographed by the camera 1, an image feature amount analyzer 15 to carry out a processing described below on the image data stored in the image data storage 3, a feature amount data storage 7 to store a processing result of the image feature amount analyzer 15, a first roadway type judgment unit 9 to carry out a processing described below on the data stored in the feature amount data storage 7, a second roadway type judgment unit 17 to perform a processing described below on the data stored in the feature amount data storage 7, a state data storage 11 to store processing results of the first roadway type judgment unit 9 and the second roadway type judgment unit 17, and a tunnel detector 19 to carry out a processing described below based on the data stored in the state data storage 11. Incidentally, the processing elements and the data storages denoted by the same reference numerals as those of FIG. 1 have the same functions as the first embodiment.

Next, the processing contents of the roadway type judgment apparatus according to the second embodiment will be described with reference to FIGS. 9 to 15. First, for example, the image feature amount analyzer 15 initializes a variable $S_i$ indicating a detection state concerning traveling in a tunnel and a variable $S_o$ indicating a detection state concerning traveling outside a tunnel to 0 (step S41). Next, the image feature amount analyzer 15 carries out the image feature amount analysis processing (step S43). The image feature amount analysis processing in this embodiment will be described with reference to FIG. 10 and FIG. 11.

Figure 10:
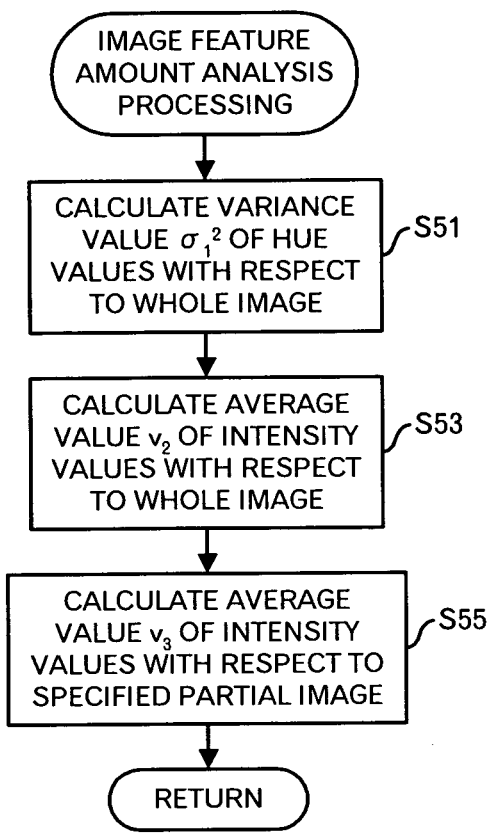
FIG. 10 is a diagram showing a processing flow of an image feature amount analysis processing in the second embodiment of the invention.

The image feature amount analyzer 15 calculates a variance value $\sigma_1^2$ of hue values h(x,y) with respect to the whole image data stored in the image data storage 3, and stores the calculated variance value $\sigma_1^2$ into the feature amount data storage 7 (FIG. 10: step S51). Besides, the image feature amount analyzer 15 calculates an average value $v_2$ of intensity values (lightness) v(x,y) with respect to the whole image data stored in the image data storage 3, and stores the calculated average value $v_2$ into the feature amount data storage 7 (step S53). The processing up to this step is the same as the first embodiment.

Figure 11:
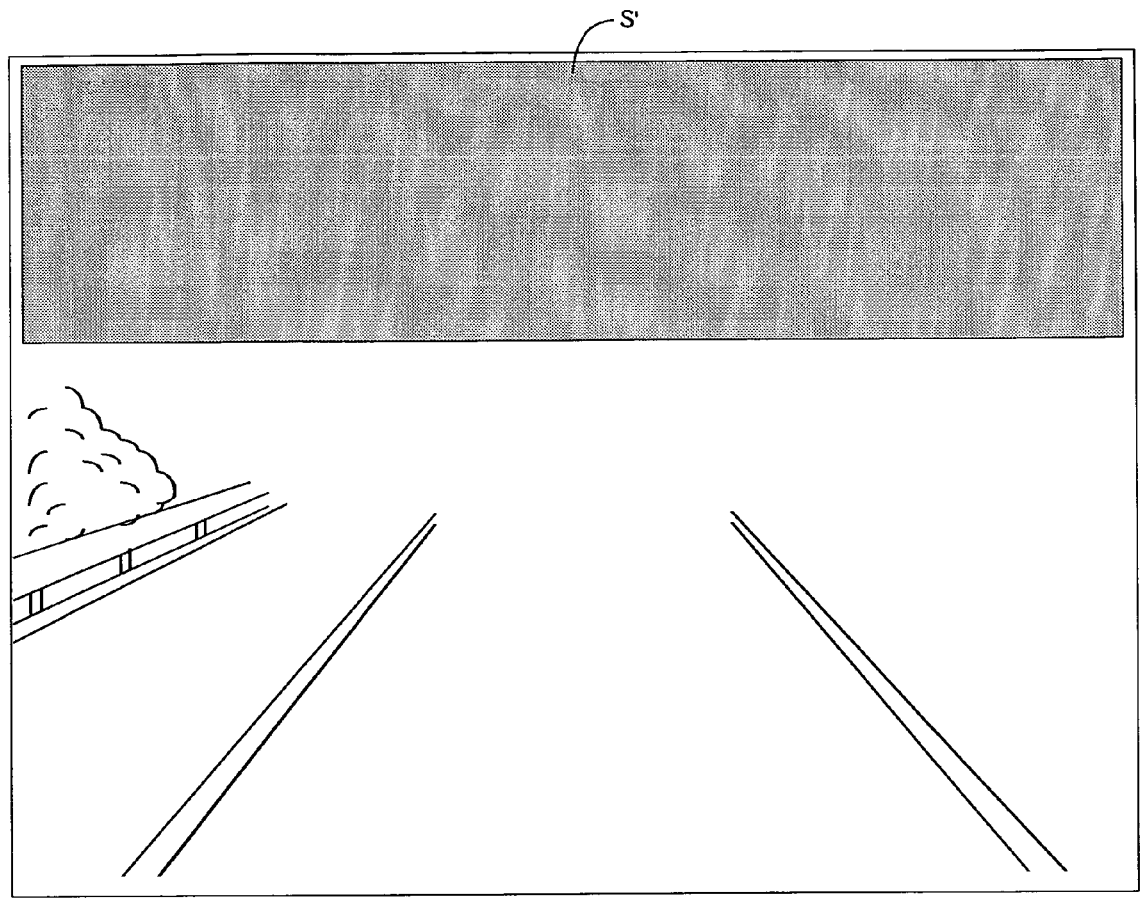
FIG. 11 is a diagram to explain a partial image S'.

The image feature amount analyzer 15 calculates an average value $v_3$ of the intensity values v(x,y) with respect to a predetermined partial image S' in the image data stored in the image data storage 3, and stores the calculated average value $v_3$ into the feature amount data storage 7 (step S55). The partial image S' is, for example, a region as shown in FIG. 11. FIG. 11 shows an example of an image photographed in the case where the camera 1 is placed to be directed toward the front of the vehicle, and the partial image S' is a portion where there is a high possibility that the sky is included. The region of the partial image S' is regulated as the portion where the sky is included at a specified ratio or higher in the daytime time zone and at the time of fine weather. After the step S55, the processing returns to the processing of FIG. 9.

Next, the first roadway type judgment unit 9 reads out the average value $v_2$ of the intensity values and the variance value $\sigma_1^2$ of the hue values with respect to the whole image data from the feature amount data storage 7, and carries out the first roadway type judgment processing (step S45). This processing is equal to the roadway type judgment processing in the first embodiment, and follows FIG. 5. Besides, the second roadway type judgment unit 17 reads out the average value $v_3$ of the intensity values with respect to the partial image S' from the feature amount data storage 7, and carries out the second roadway type judgment processing (step S47). This processing will be described with reference to FIG. 12 and FIG. 13.

Figure 13:
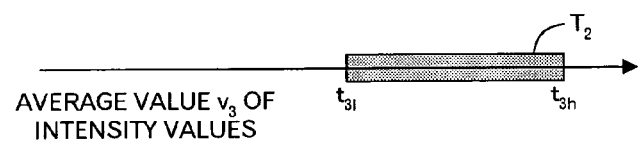
FIG. 13 is a diagram to explain a range of an average value of intensities in the partial image in the second embodiment of the invention.

The second roadway type judgment unit 17 judges whether or not the average value $v_3$ of the intensity values with respect to the partial image S', which is stored in the feature amount data storage 7, is not less than $t_{3l}$ and not higher than $t_{3h}$ (step S61). As described above, when traveling is being carried out outside a tunnel, because the ratio of the sky becomes high in the partial image S' as compared with the whole image data, the average value of the intensity values in the partial image S' becomes high as compared with the average value of the intensity values with respect to the whole image. Accordingly, a range of the average value of the intensity values with respect to the partial image S', which can occur in the case where traveling is being carried out outside a tunnel, a range of the average value of the intensity values with respect to the partial image S', which can occur in the case where traveling is being carried out in a tunnel, and the like are actually measured, and a range $T_2$ in which it is judged that traveling is being carried out outside a tunnel is previously determined to be a range from $t_{3l}$ to $T_{3h}$ as shown in FIG. 13.

Accordingly, at the step S61, when it is judged that the condition is satisfied, the second roadway type judgment unit sets $S_o=1$ (step S63). The variable $S_o$ is stored as state data into the state data storage 11, and the processing returns to the original processing. On the other hand, in the case where it is judged that the condition is not satisfied, the processing returns directly to the original processing. That is, $S_o=0$ is maintained.

Figure 9:
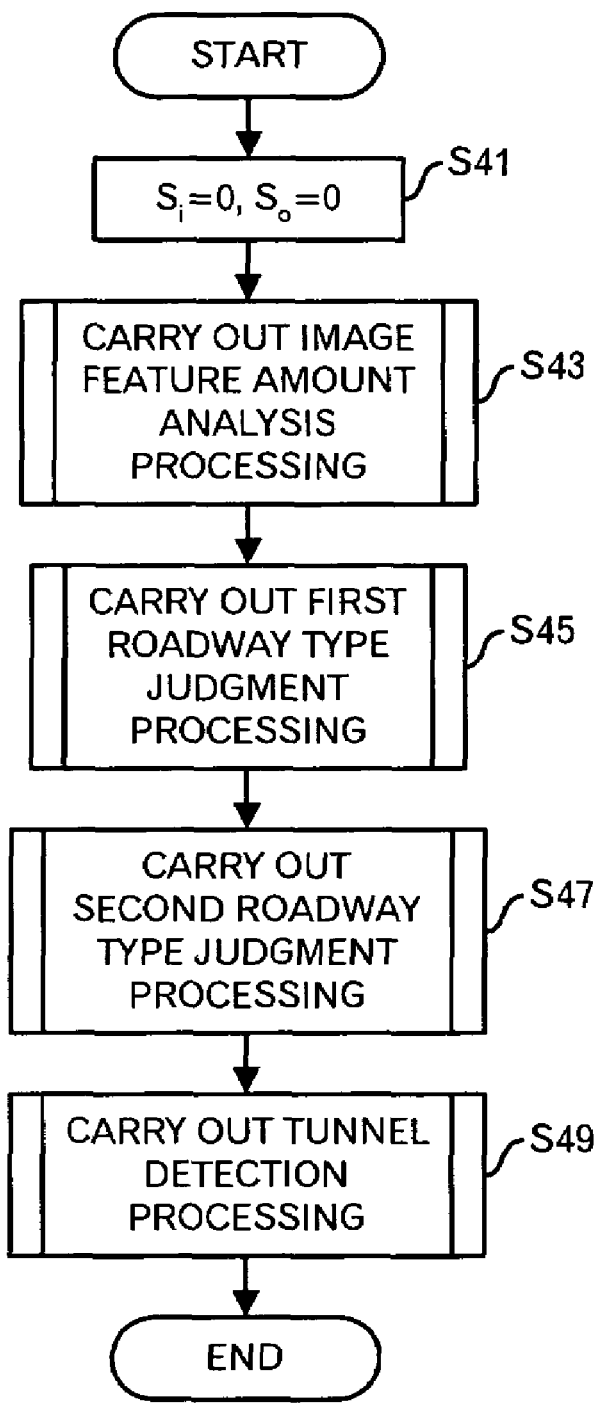
FIG. 9 is a diagram showing a main processing flow in the second embodiment of the invention.
Figures 14, 15:
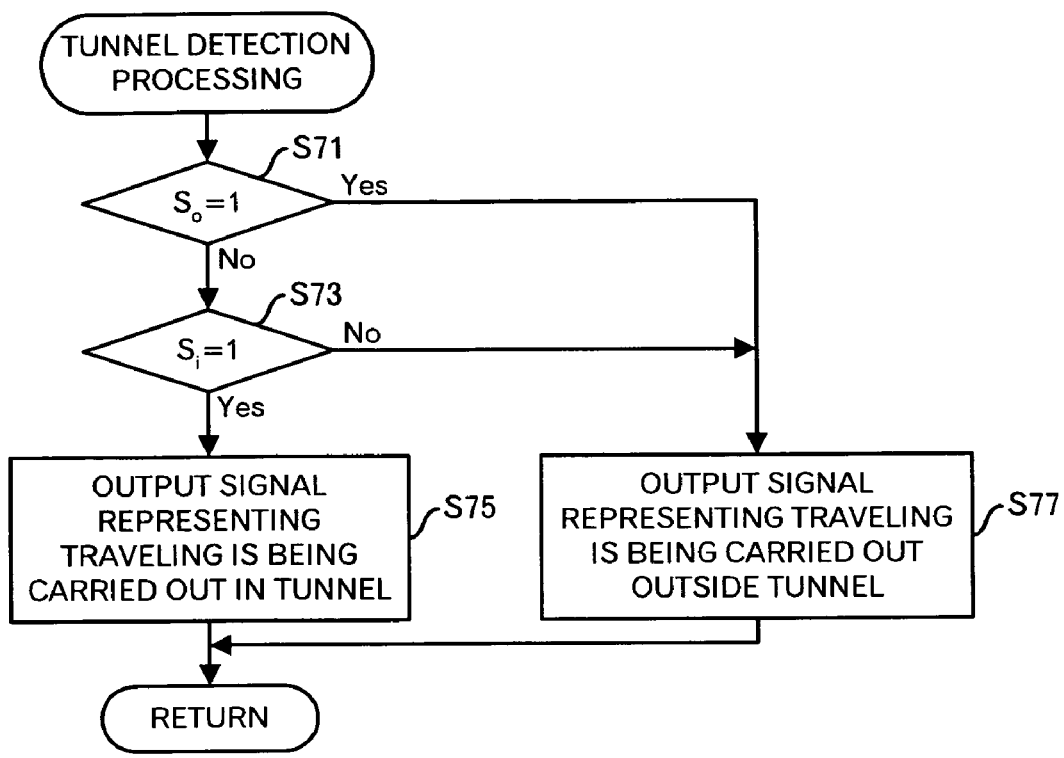
FIG. 14 is a diagram showing a processing flow of a tunnel detection processing in the second embodiment of the invention.
FIG. 15 is a diagram showing a specific example in the second embodiment of the invention.

Returning to the description of FIG. 9, the tunnel detector 19 next carries out the tunnel detection processing (step S49). This processing is shown in FIG. 14. The tunnel detector 19 judges whether or not the value of $S_o$ stored in the state data storage 11 is 1 (step S71). In the case of $S_o=1$, because it can be judged that traveling is being carried out outside a tunnel, the tunnel detector 19 outputs a signal indicating that traveling is being carried out outside a tunnel (step S77). Then, the processing returns to the original processing.

On the other hand, in the case of $S_o=0$, because it cannot be said that traveling is being carried out outside a tunnel, the tunnel detector 19 judges whether or not the value of $S_i$ stored in the state data storage 11 is 1 (step S73). In the case of $S_i=0$, it cannot be said that traveling is being carried out in a tunnel, the processing shifts to step S77. In the case of $S_i=1$, because it can be judged that traveling is being carried out in a tunnel, the tunnel detector 19 outputs a signal indicating that traveling is being carried out in a tunnel (step S75).

As stated above, in addition to the average value $v_2$ of the intensity values and the variance value $\sigma_1^2$ of the hue values with respect to the whole image data to judge whether or not traveling is being carried out in a tunnel, the average value $v_3$ of the intensity values with respect to the specific image portion S' is used to judge whether or not traveling is being carried out outside a tunnel, so that the accuracy of the judgment can be raised.

Incidentally, although the example has been described in which in the case of $S_i=0$ at the step S73, the processing shifts to the step S77, a judgment may be made such that the roadway type is unclear. Further, the sequence of the judgments of the step S71 and step S73 may be reversed.

Incidentally, the processing shown in FIG. 9 is carried out at every specified interval such as every frame.

For example, it is assumed that the respective limit values are $t_{1l}=0$, $t_{1h}=48$, $t_{2l}=0$, $t_{2h}=98$, $t_{3l}=148$ and $t_{3h}=255$, and $\sigma_1^2$, $v_2$ and $v_3$ as shown in FIG. 15 are calculated. Then, at the first frame, $S_i=1$ and $S_o=0$ are obtained, and it is judged that traveling is being carried out in a tunnel. At the second frame, $S_i=1$ and $S_o=1$ are obtained, $S_o$ is adopted with priority at the step S71, and it is judged that traveling is being carried out outside a tunnel. At the third frame, $S_i=0$ and $S_o=1$ are obtained, and although the state data is different from that of the second frame, $S_o$ is adopted with priority, and it is judged that traveling is being carried out outside a tunnel. On the other hand, in the fourth frame, $S_i=0$ and $S_o=0$ are obtained, and at the step S73, it is judged based on $S_i$ that traveling is being carried out outside a tunnel. In the case of the fourth frame, it may be judged that the roadway type is unclear.

Incidentally, at the step S55 of FIG. 10, although the description has been given to the example in which the average value $v_2$ of the intensity values $v(x,y)$ is used as the feature amount of the partial image S', not only at least one of the intensity (V), hue (H) and chroma (S) expressed in HSV format, but also at least one component in spaces expressed in various formats such as RGB format, YCbCr format, L*a*b* format, and L*u*v* format may be used with respect to the feature amount $f(x,y)$. Besides, a result obtained by applying a spatial filter typified by a Laplacian filter or a Sobel filter to the image data expressed in one of those formats may be used as the feature amount $f(x,y)$. In that case, a processing using the spatial filter is carried out before the step S55 of FIG. 10.

Figure 12:
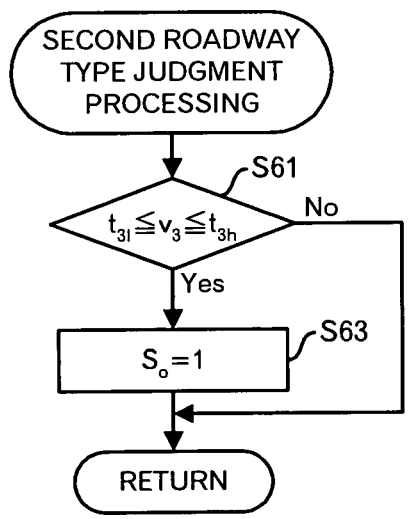
FIG. 12 is a diagram showing a processing flow of a second roadway type judgment processing in the second embodiment of the invention.

Besides, in the roadway type judgment processing of FIG. 12, although the range in which it is judged that traveling is carried out outside a tunnel is regulated by the upper limit and the lower limit of the average value of the intensity values as shown in the graph of FIG. 13, also in the case where the feature amount $f(x,y)$ is other than the intensity, with respect to a component adopted as the feature amount $f(x,y)$, a range in which it is judged that traveling is being carried out outside a tunnel may be statistically specified.

Embodiment 3

Figure 16:
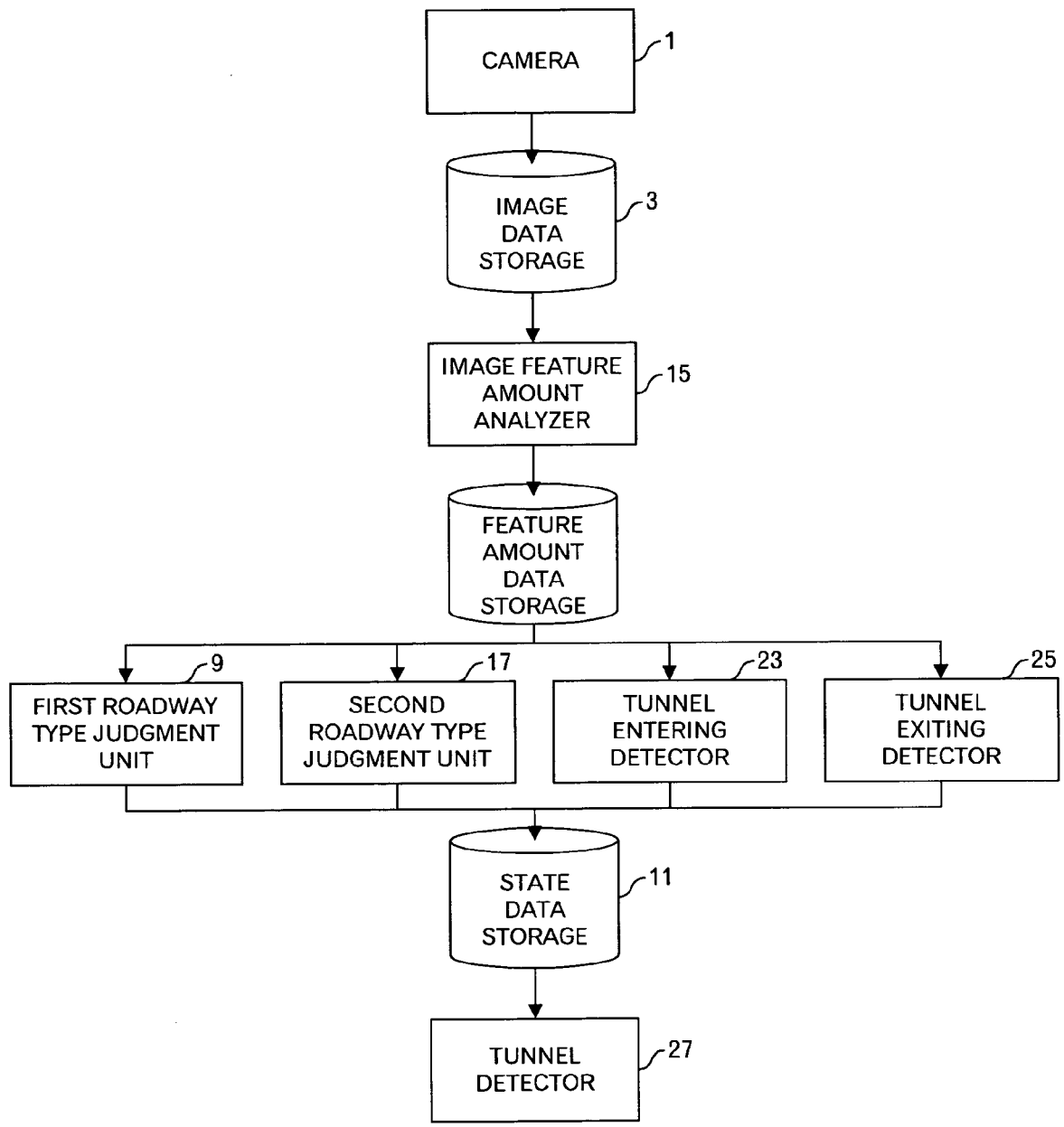
FIG. 16 is a functional block diagram in a third embodiment of the invention.

FIG. 16 is a functional block diagram of a roadway type judgment apparatus according to a third embodiment of the present invention. The roadway type judgment apparatus of this embodiment includes an camera 1, an image data storage 3 to store image data photographed by the camera 1, an image feature amount analyzer 15 to carry out a processing described below on the image data stored in the image data storage 3, a feature amount data storage 7 to store a processing result of the image feature amount analyzer 15, a first roadway type judgment unit 9 to carry out a processing described above on the data stored in the feature amount data storage 7, a second roadway type judgment unit 17 to carry out a processing described above on the data stored in the feature amount data storage 7, a tunnel entering detector 23 to carry out a processing described below on the data stored in the feature amount data storage 7, a tunnel exiting detector 25 to carry out a processing described below on the data stored in the feature amount data storage 7, a state data storage 11 to store processing results of the first roadway type judgment unit 9, the second roadway type judgment unit 17, the tunnel entering detector 23 and the tunnel exiting detector 25, and a tunnel detector 27 to carry out a processing described below based on the data stored in the state data storage 11. Incidentally, the processing elements and the data storages denoted by the same reference numerals as those of FIG. 1 and FIG. 8 have the same functions as the first and the second embodiments.

Next, the processing contents of the roadway type judgment apparatus according to the third embodiment will be described with reference to FIGS. 17 to 20. First, for example, the image feature amount analyzer 15 initializes a variable $S_i$ indicating a detection state concerning traveling in a tunnel and a variable $S_o$ indicating a detection state concerning traveling outside a tunnel to 0 (step S81). Next, the image feature amount analyzer 15 carries out the image feature amount analysis processing (step S83). The image feature amount analysis processing in this embodiment is the same as the image feature amount analysis processing in the second embodiment, and follows the processing flow of FIG. 10. Incidentally, the results of the image feature amount analysis processing are stored in the feature amount data storage 7 in time sequence.

The first roadway type judgment unit 9 reads out an average value $v_2$ of intensity values and a variance value $\sigma_1^2$ of hue values with respect to the whole image data from the feature amount data storage 7, and carries out the first roadway type judgment processing (step S85). This processing is the same as the roadway type judgment processing in the first embodiment, and follows FIG. 5. The second roadway type judgment unit 17 reads out an average value $v_3$ of intensity values with respect to the partial image S' from the feature amount data storage 7, and carries out the second roadway type judgment processing (step S87). This processing is the same as the second roadway type judgment processing of the second embodiment, and follows FIG. 12.

Thereafter, it is judged whether a variable $S_t$ indicating entrance into a tunnel or exit from a tunnel is 1 (step S89), and in the case of $S_t=1$, the tunnel exiting detector 25 carries out the tunnel exiting detection processing (step S91). On the other hand, in the case of $S_t=0$, the tunnel entering detector 23 carries out the tunnel entering detection processing (step S93). These processings will be described with reference to FIG. 18 and FIG. 19.

The tunnel entering detector 23 and the tunnel-exiting detector 25 detect the entrance of the vehicle into a tunnel and the exit of the vehicle from a tunnel based on the following principle. That is, at the time of the entrance into the tunnel or the exit from the tunnel, because the lightness is different between the inside and the outside of the tunnel, the AGC of the camera 1 is actuated to automatically lower or raise the exposure. When the vehicle enters the tunnel in the daytime, an image instantaneously becomes dark, and when the vehicle enters the tunnel in the nighttime, an image instantaneously becomes bright. Because the relation of the luminance between the inside of the tunnel and the outside of the tunnel is changed between the daytime and the nighttime, the case of the daytime will be described below.

Accordingly, the tunnel exiting detector 25 calculates a variation x between an average value $v_2(n)$ of the intensity values for the present frame and $v_2(0)$ for n frames before (step S101). A minimum value and a maximum value are searched from values of $v_2(0)$ to $v_2(n)$, the minimum value is denoted as $v_2(\min)$, and the maximum value is denoted as $v_2(\max)$. At this time, "min" represents a frame number at the time of $v_2(\min)$, and "max" represents a frame number at the time of $v_2(\max)$. When min<max is established, the variation x is made $\{v_2(\max)-v_2(\min)\}$, and when max<min is established, the variation x is made $\{v_2(\min)-v_2(\max)\}$. A specific value may always be adopted as n. Besides, in the case where speed data of the vehicle can be acquired, n is decreased when the speed increases, n is increased when the speed decreases, and exiting the tunnel and entering the tunnel are suitably detected by catching the timing of the occurrence of a characteristic image. Next, the tunnel exiting detector 25 compares the variation x with $t_{4h}$ as a threshold at the time of increase of the variation, and the tunnel exiting detector 25 judges whether or not a condition of variation $x \geq t_{4h}$ is satisfied (step S103). In case it is judged the condition is satisfied, because it is conceivable that a movement is made from a dark place (in the tunnel) to a bright place (outside the tunnel), the tunnel exiting detector 25 sets $S_t=0$ (step S105). Then, the processing returns to the original processing. The variable $S_t$ is also stored as state data into the state data storage 11. Incidentally, although the example has been described in which the difference is calculated at the step S101, a ratio may be calculated. In any event, the abrupt increase of the average value of intensity values is detected, and in the case where it can be detected, the variable $S_t$ indicating the exit from the tunnel is set to 0.

On the other hand, when it is judged that the condition of variation $x \geq t_{4h}$ is not satisfied, because the exit from the tunnel cannot be detected, the processing returns directly to the original processing.

Figure 19:
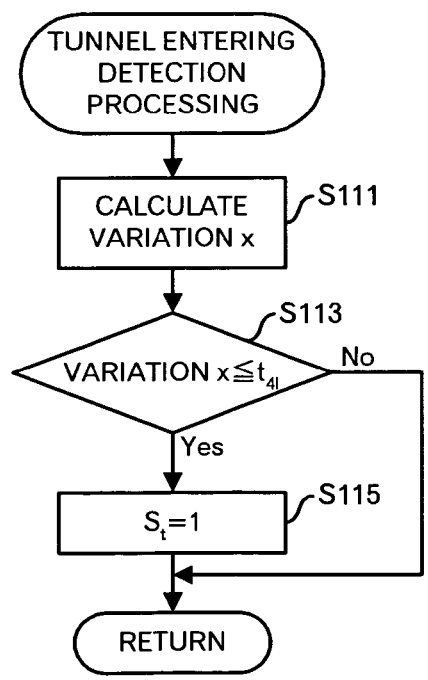
FIG. 19 is a diagram showing a processing flow of a tunnel entering detection processing in the third embodiment of the invention.

Similarly, the tunnel entering detector 23 calculates the variation x between the average value $v_2(n)$ of intensity values for the present frame and $v_2(0)$ for n frames before (FIG. 19: step S111). The numeral n is set as described above. Next, the tunnel entering detector 23 compares the variation x with $t_{4l}$ as a threshold at the time of decrease of the variation, and judges whether or not a condition of variation $x \leq t_{4l}$ is satisfied (step S113). In case it is judged that the condition is satisfied, because it is conceivable that a movement is made from a bright place (outside the tunnel) to a dark place (in the tunnel), the tunnel entering detector 23 sets $S_t=1$ (step S115). Then, the processing returns to the original processing. The variable $S_t$ is also stored as state data into the state data storage 11. Incidentally, although the example has been given in which the difference is calculated at the step S111, a ratio may be calculated. In any event, the abrupt decrease of the average value of intensity values is detected, and in the case where it is detected, the variable $S_t$ indicating the entrance into the tunnel is set to 1.

On the other hand, in the case where it is judged that the condition of variation $x \geq t_{4l}$ is not satisfied, because the entrance into the tunnel cannot be detected, the processing returns directly to the original processing. Incidentally, $S_t$ is made 0 at the time of initialization of the roadway type judgment apparatus and is not initialized at the time of each frame processing.

Figure 17:
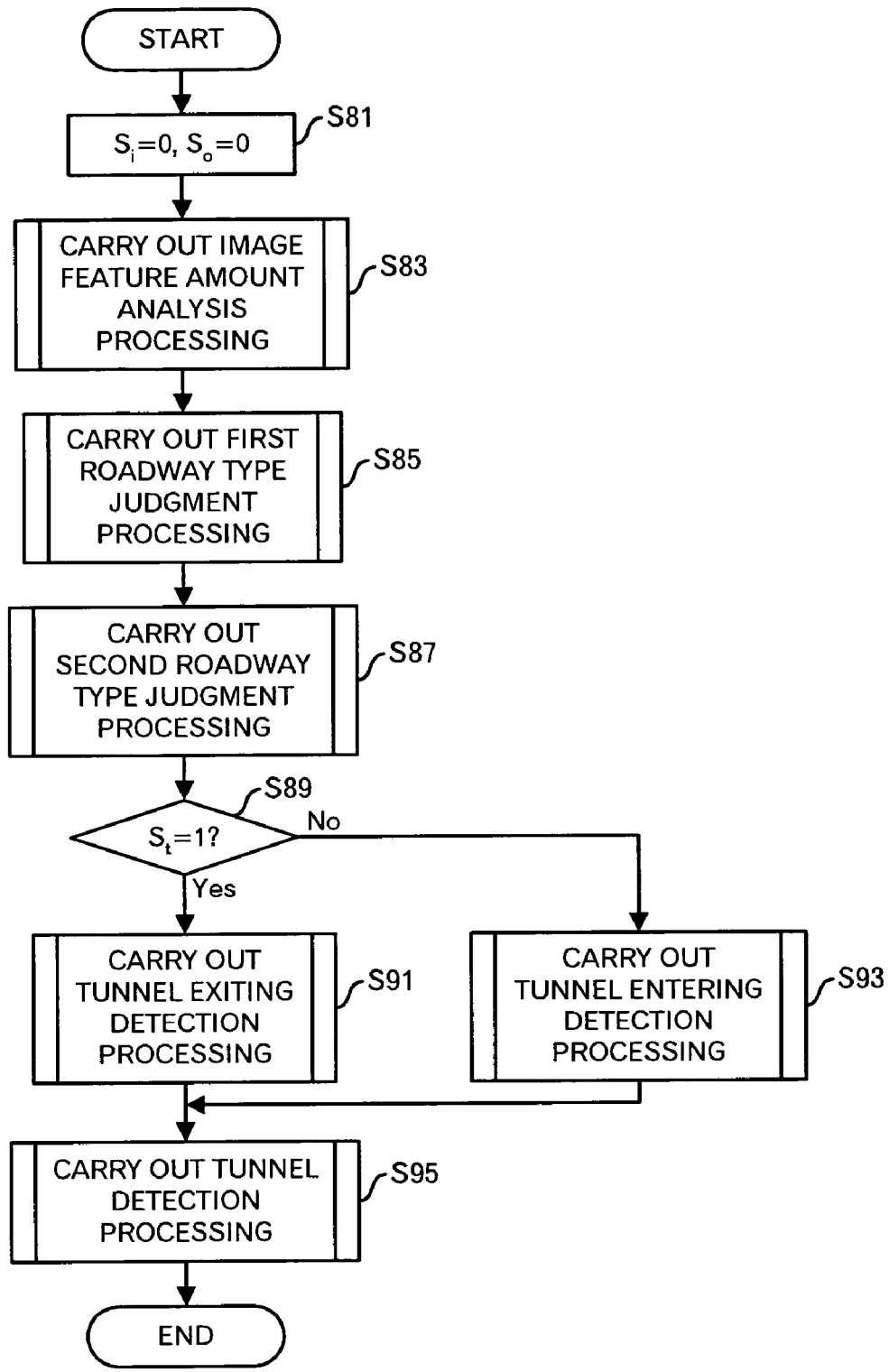
FIG. 17 is a diagram showing a main processing flow in the third embodiment of the invention.

Returning to the description of FIG. 17, the tunnel detector 27 carries out the tunnel detection processing (step S95). The tunnel detection processing will be described with reference to FIG. 20 and FIG. 21. The tunnel detector 27 judges whether or not $S_o$ stored in the state data storage 11 is 1 (step S121). Because $S_o=1$ is established in the case where it is judged that the vehicle is outside a tunnel, when $S_o=1$ is obtained, the tunnel detector 27 outputs a signal indicating that traveling is being carried out outside a tunnel (step S129). Then, the processing returns to the original processing.

On the other hand, when $S_o=0$ is obtained, the tunnel detector 27 judges whether or not $S_i$ stored in the state data storage 11 is 1 (step S123). Because $S_i=1$ is established in the case where it is judged that the vehicle is in a tunnel, when $S_i=1$ is obtained, the tunnel detector 27 outputs a signal indicating that traveling is being carried out in a tunnel (step S127). Then, the processing returns to the original processing.

When $S_i=0$ is obtained, the tunnel detector judges whether or not $S_t$ stored in the state data storage 11 is 1 (step S125). Because $S_t=1$ is established in the case where it is judged that the vehicle enters a tunnel, when $S_t=1$ is obtained, the processing shifts to the step S127. On the other hand, because $S_t=0$ is established in the case where it is judged that the vehicle exits a tunnel, when $S_t=0$ is obtained, the processing shifts to the step S129.

By carrying out the processing as stated above, the judgment accuracy can be improved by supplementary using the detection results of the entrance into the tunnel or the exit from the tunnel.

Incidentally, the processing shown in FIG. 17 is carried out at every specified interval such as every frame.

Figures 20, 21:
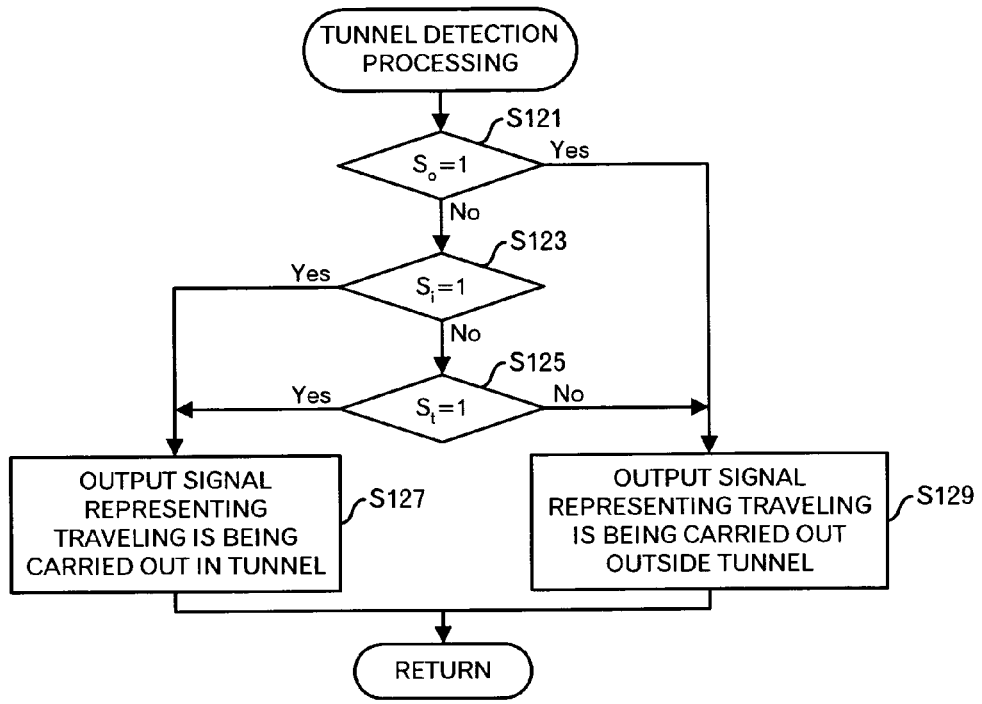
FIG. 20 is a diagram showing a processing flow of a tunnel detection processing in the third embodiment of the invention.
FIG. 21 is a diagram showing a specific example in the third embodiment of the invention.

For example, it is assumed that the respective limit values are $t_{1l}=0$, $t_{1h}=48$, $t_{2l}=0$, $t_{2h}=98$, $t_{3l}=148$, $t_{3h}=255$, $t_{4h}=18$ and $t_{4l}=-18$, and $\sigma_1^2$, $v_2$, $v_3$ and the variation x of $v_2$ as shown in FIG. 21 are calculated. Incidentally, here, n=1 is set. Besides, $S_t=1$ is initially set. Then, at the first frame, $S_i=1$ and $S_o=0$ are obtained, and it is judged that traveling is being carried out in a tunnel. Next, at the second frame, $S_i=1$ and $S_o=1$ are obtained, and further, the variation x of $v_2$ is 20 and is not lower than $t_{4h}$, and $S_t$ is set to 0. In this embodiment, at the step S121, $S_o$ has an effect, and it is judged that traveling is being carried out outside a tunnel.

Further, at the third frame, $S_i=0$ and $S_o=1$ are obtained, and the variable $S_t$ remains $S_t=0$. Here, because $S_o$ has an effect preferentially, the same judgment result as the second frame is obtained. Besides, at the fourth frame, $S_i=0$ is obtained, and $S_o=0$ is obtained because $v_3$ is decreased, however, the variable $S_t$ remains $S_t=0$. By this, it is judged at the step S125 that traveling is being carried out outside a tunnel.

Figure 18:
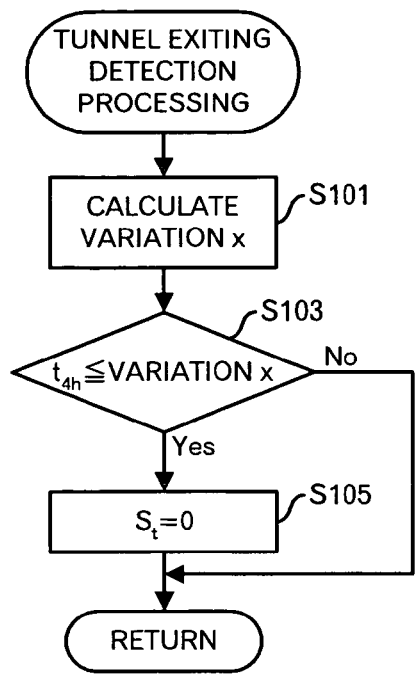
FIG. 18 is a diagram showing a processing flow of a tunnel exiting detection processing in the third embodiment of the invention.

Incidentally, at the step S101 of FIG. 18 and at the step S111 of FIG. 19, although the description has been given to the example in which the average value $v_2$ of intensity values $v(x,y)$ for the frame is used as the feature amount, the average value may be calculated with respect to an arbitrary area S predetermined in the frame. With respect to the feature amount f(x, y), not only at least one of the intensity (V), hue (H) and chroma (S) expressed in HSV format, but also at least one component in spaces expressed in various formats such as RGB format, YCbCr format, L*a*b* format, and L*u*v* format may be used. Besides, a result obtained by applying a spatial filter typified by a Laplacian filter or a Sobel filter to image data expressed in one of those formats may be used as the feature amount f(x,y). In that case, a processing using the spatial filter is carried out before the step S101 of FIG. 18 and the step S111 of FIG. 19.

Besides, in FIGS. 18 and 19, although the description has been given to the case of the daytime, in the case of the nighttime, because it is conceivable that a vehicle exits a tunnel when it moves from a bright place to a dark place, at the step S103 of FIG. 18, the variation x is compared with $t_{5l}$ as a threshold at the time of the variation, and it is judged whether or not a condition of variation $x \leq t_{s1}$ is satisfied. Besides, because it is conceivable that the vehicle enters a tunnel when it moves from a dark place to a bright place, at the step S113 of FIG. 19, the variation x is compared with $t_{sh}$ as a threshold at the time of increase of the variation, and it is judged whether or not a condition of variation $x \geq t_{sh}$ is satisfied. In order to discriminate between the daytime and the nighttime, for example, a discrimination unit is used which recognizes the case where the exposure time of a camera is shorter than a specific threshold to be the daytime, and the case where it is longer than the threshold to be the nighttime.

Embodiment 4

Figure 22:
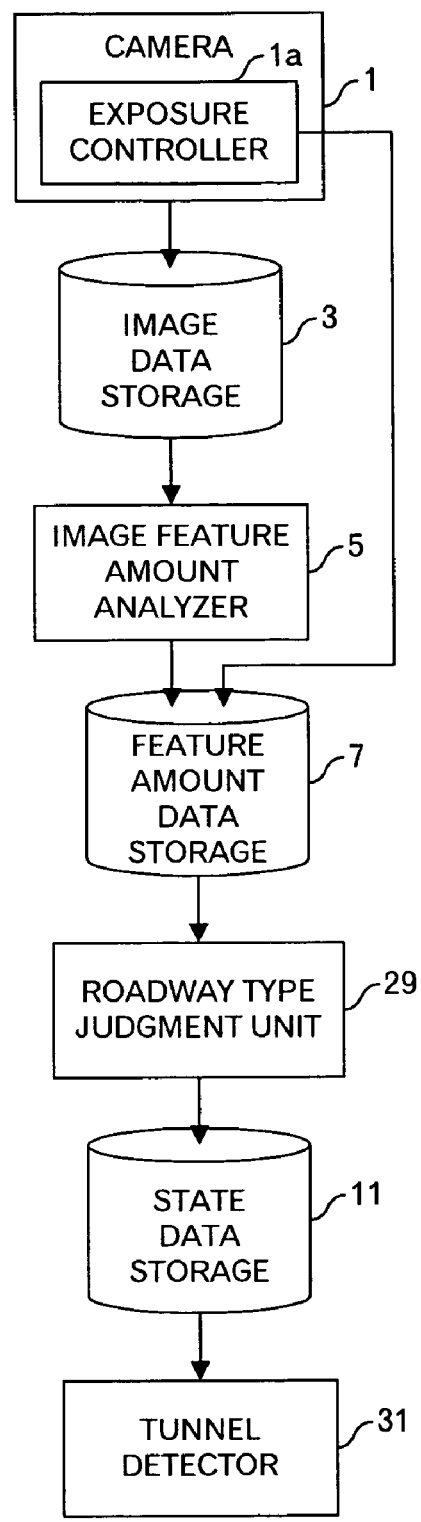
FIG. 22 is a functional block diagram of a fourth embodiment of the invention.

FIG. 22 is a functional block diagram of a roadway type judgment apparatus according to a fourth embodiment of the present invention. The roadway type judgment apparatus of this embodiment includes an camera 1 having an exposure controller 1a, an image data storage 3 to store image data photographed by the camera 1, an image feature amount analyzer 5 to carry out the processing described above on the image data stored in the image data storage 3, a feature amount data storage 7 to store a processing result of the image feature amount analyzer 5 and an output result of the exposure controller 1a, a roadway type judgment unit 29 to carry out a processing described below on the data stored in the feature amount data storage 7, a state data storage 11 to store a processing result of the roadway type judgment unit 29, and a tunnel detector 31 to carry out a processing described below based on the data stored in the state data storage 11. The processing elements and the data storages denoted by the same reference numerals as those of FIG. 1 have the same functions as the first embodiment.

In this embodiment, the exposure controller 1a is provided in the camera 1, and it is assumed that the exposure is adjusted by changing a shutter speed. That is, the shutter speed s is treated as an exposure amount. The exposure controller 1a adjusts the lightness of an image to be photographed by increasing the shutter speed when the image to be photographed is light and by decreasing the shutter speed when it is dark. The exposure controller 1a stores the data of the shutter speed s in every frame into the feature amount data storage 7.

The processing flow in this embodiment is the same as that shown in FIG. 2 in the first embodiment, and the processing content of the image feature amount analyzer 5 is also the same as that shown in FIG. 3. The processing content of the roadway type judgment unit 29 is as shown in FIG. 23.

In this embodiment, by using a fact that in an illuminated tunnel, the lightness is kept within a constant range and the shutter speed also falls within a certain range, the roadway type judgment unit 29 carries out a processing as described below. That is, the roadway type judgment unit 29 judges whether or not the shutter speed s is not lower than a lower limit value $t_{s1}$ of the shutter speed s and not higher than an upper limit value $t_{sh}$ (step S131). When it is judged that the shutter speed s is not within such a range, $S_i=0$ is set (step S137). The variable $S_i$ is state data and is stored in the state data storage 11. On the other hand, when it is judged that the shutter speed s is within the range, from the average value $v_2$ of intensity values stored in the feature amount data storage 7 and the variance value $\sigma_1^2$ of hue values, the roadway type judgment unit 29 judges whether or not a condition of $t_{1l} \leq \sigma_1^2 \leq t_{1h}$ and $t_{2l} \geq v_2 \leq t_{2h}$ is satisfied (step S133). In case it is judged that the condition is not satisfied, the processing shifts to the step S137. That is, $S_i=0$ is maintained. On the other hand, in case it is judged that the condition is satisfied, the roadway type judgment unit 29 sets $S_i=1$ (step S135). The variable $S_i$ is stored as state data into the state data storage 11. Then, the processing returns to the original processing.

Thus, only when the shutter speed s is within the suitable range, the judgment is made based on the average value of intensity values and the variance value of hue values, and accordingly, the judgment that traveling is being carried out in a tunnel can be improved in accuracy.

Figures 23, 24:
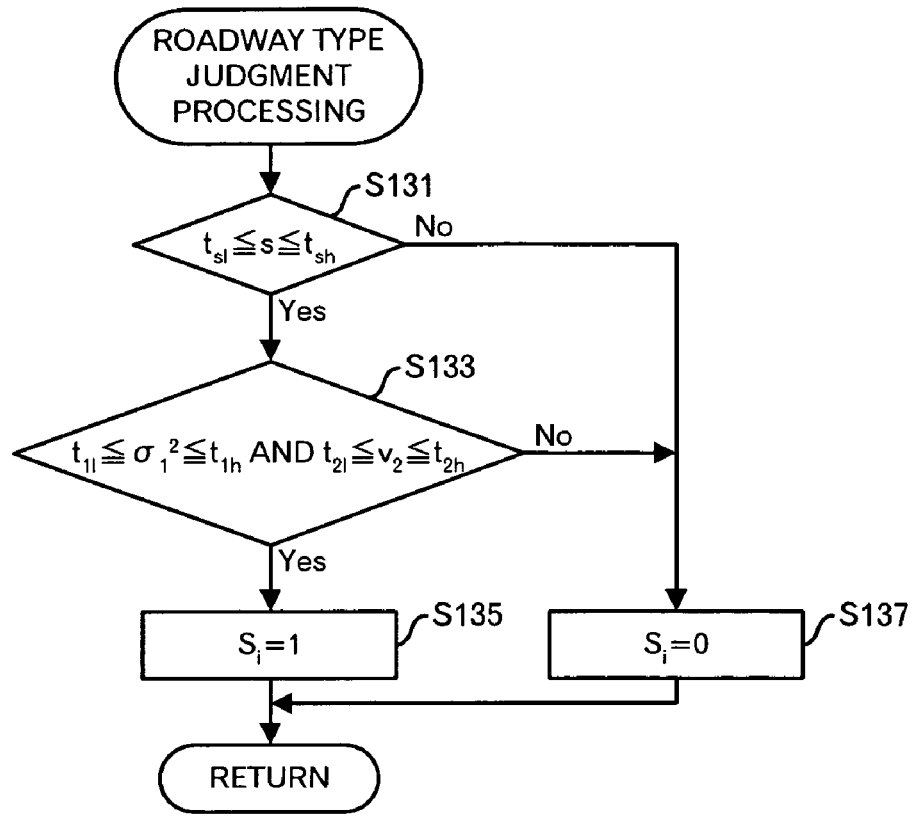
FIG. 23 is a diagram showing a processing flow of a roadway type judgment processing in the fourth embodiment of the invention.
FIG. 24 is a diagram showing a specific example in the fourth embodiment of the invention.

Incidentally, in the case where the lower limit value of the shutter speed is $t_{sl}=\frac{1}{2000}$, the upper limit value is $t_{sh}=\frac{1}{10000}$, and the respective limit values are $t_{1l}=0$, $t_{1h}=48$, $t_{2l}=0$, and $t_{2l}=98$, it is assumed that s, $\sigma_1^2$, and $v_2$ are specified as in FIG. 24. In the case of the first frame, because the shutter speed s does not satisfy the condition, $S_i=0$ is automatically set. The same applies to the second and the third frames. In the fourth frame, because the shutter speed s satisfies the condition, and the average value $v_2$ of intensity values and the variance value $\sigma_1^2$ of hue values also satisfy the condition, $S_i=1$ is set.

Although the embodiments of the invention have been described, the invention is not limited to these. For example, the respective functional blocks do not necessarily correspond to actual program modules. Besides, also in the processing flow, the sequence of the steps may be changed or the parallel execution may be carried out within a range where the processing result does not change.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A roadway type judgment method, comprising:
   calculating, with respect to image data from a camera mounted in or on a vehicle or image data obtained by carrying out a specified conversion on said image data from said camera, a feature amount of at least one component among a plurality of components in a specified color space of the image, and storing the calculated feature amount into a feature amount data storage;
   determining whether or not said feature amount stored in said feature amount data storage satisfies a predetermined condition; and
   judging, based on a determination result in said determining, whether or not said vehicle travels inside a tunnel, and
   wherein said feature amount in said calculating includes a feature amount of intensity and a feature amount of hue, said predetermined condition includes a condition relating to said intensity and a condition relating to said hue, and said feature amount of said intensity is an average value of intensity values, and said feature amount of said hue is a variance value of hue values.

2. The roadway type judgment method as set forth in claim 1, wherein said feature amount in said calculating includes a feature amount with respect to the whole image data and a feature amount with respect to a specified portion of said image data, and said predetermined condition includes a condition with respect to the whole image data and a condition with respect to said specified portion of said image data.

3. The roadway type judgment method as set forth in claim 2, wherein said feature amount with respect to said whole image data includes an average value of intensity values and a variance value of hue values, and said feature amount with respect to said specified portion of said image data includes an average value of intensity values in an upper specified portion of said image data photographed in a forward direction of said vehicle, and said condition with respect to said whole image data includes a condition relating to said average value of intensity values and a condition relating to said variance value of hue values, and said condition with respect to said specified portion of said image data includes an average value of intensity values with respect to said upper specified portion of said image data photographed in said forward direction of said vehicle.

4. The roadway type judgment method as set forth in claim 1, further comprising:
    calculating a feature amount concerning change between first image data and second image data photographed said first image data, and storing the calculated feature amount into said feature amount data storage; and
    determining whether or not said feature amount concerning said change satisfies a condition representing entrance into said tunnel or a condition representing exit from said tunnel, and
    wherein said judging is carried out based further on a result of determination using said feature amount concerning said change.

5. The roadway type judgment method as set forth in claim 4, wherein said feature amount concerning said change includes a variation or a change ratio of intensity.

6. The roadway type judgment method as set forth in claim 4, wherein said determining whether or not said feature amount concerning said change satisfies a condition representing entrance into said tunnel or a condition representing exit from said tunnel comprises: upon detection that it is judged that said condition representing entrance into said tunnel is satisfied, determining whether or not said feature amount concerning said change satisfies said condition representing exit from said tunnel; and upon detection that it is judged that said condition representing exit from said tunnel is satisfied, determining whether or not said feature amount concerning said change satisfies said condition representing entrance into said tunnel.

7. The roadway type judgment method as set forth in claim 4, wherein upon detection that it is not judged, based on said determination result in said determining whether or not said feature amount stored in said feature amount data storage satisfies said predetermined condition, that said vehicle travels inside said tunnel, said judging is carried out based on a result of determination using said feature amount concerning said change.

8. The roadway type judgment method as set forth in claim 1, wherein said judging comprises judging whether or not said vehicle travels inside said tunnel based further on an exposure control parameter of said camera.

9. The roadway type judgment method as set forth in claim 8, wherein said exposure control parameter is a shutter speed.

10. The roadway type judgment method as set forth in claim 8, wherein upon detection that it is judged, based on said exposure control parameter, that said vehicle travels inside said tunnel, said judging is carried out based on said determination result in said determining.

11. A computer-readable storage medium storing a roadway type judgment program for causing a computer to executed a process, comprising:
    calculating, with respect to image data from a camera mounted in or on a vehicle or image data obtained by carrying out a specified conversion on said image data from said camera, a feature amount of at least one component among a plurality of components in a specified color space of the image, and storing the calculated feature amount into a feature amount data storage;
    determining whether or not said feature amount stored in said feature amount data storage satisfies a predetermined condition; and
    judging, based on a determination result in said determining, whether or not said vehicle travels inside a tunnel, and
    wherein said feature amount in said calculating includes a feature amount of intensity and a feature amount of hue,
    said predetermined condition includes a condition relating to said intensity and a condition relating to said hue, and
    said feature amount of said intensity is an average value of intensity values, and said feature amount of said hue is a variance value of hue values.

12. A roadway type judgment apparatus, comprising:
    a feature amount data storage device;
    a calculation unit that calculates, with respect to image data from a camera mounted in or on a vehicle or image data obtained by carrying out a specified conversion on said image data from said camera, a feature amount of at least one component among a plurality of components in a specified color space of the image, and stores the calculated feature amount into said feature amount data storage device;
    a determination unit that determines whether or not said feature amount stored in said feature amount data storage device satisfies a predetermined condition; and
    a judgment unit that judges, based on a determination result in said determining, whether or not said vehicle travels inside a tunnel, and
    wherein said feature amount calculated by said calculation unit includes a feature amount of intensity and a feature amount of hue,
    said predetermined condition includes a condition relating to said intensity and a condition relating to said hue, and
    said feature amount of said intensity is an average value of intensity values, and said feature amount of said hue is a variance value of hue values.

13. The roadway type judgment apparatus as set forth in claim 12, wherein said feature amount calculated by said calculation unit includes a feature amount with respect to the whole image data and a feature amount with respect to a specified portion of said image data, and said predetermined condition includes a condition with respect to the whole image data and a condition with respect to said specified portion of said image data.

14. The roadway type judgment apparatus as set forth in claim 12, further comprising:
    a unit that calculates a feature amount concerning an change between first image data and second image data photographed before said first image data, and stores the calculated feature amount into said feature amount data storage device; and
    a second determination unit that determines whether or not said feature amount concerning said change satisfies a condition representing entrance into said tunnel or a condition representing exit from said tunnel, and
    wherein, said judgment unit judges whether or not said vehicle travels inside said tunnel based further on a determination result of said second determination unit.

15. The roadway type judgment apparatus as set forth in claim 12, wherein said judgment unit judges whether or not said vehicle travels inside said tunnel, based further on an exposure control parameter of said camera.

* * * * *